US005503947A

United States Patent [19]
Kelly et al.

[11] Patent Number: 5,503,947
[45] Date of Patent: Apr. 2, 1996

[54] NI-$H_2$ BATTERY HAVING IMPROVED THERMAL PROPERTIES

[75] Inventors: William H. Kelly, Gaithersburg; Wein-Shen Jiang, Germantown; Ronald R. Kessler, Mt. Airy; Max A. Morris, Frederick; Martin W. Earl, Silver Spring, all of Md.

[73] Assignee: Comsat Corporation, Bethesda, Md.

[21] Appl. No.: 711,602

[22] Filed: Jun. 7, 1991

Related U.S. Application Data

[63] Continuation of Ser. No. 501,708, Mar. 30, 1990, abandoned.

[51] Int. Cl.$^6$ .......................... H01M 10/50; H01M 12/06
[52] U.S. Cl. ............................................ 429/101; 429/120
[58] Field of Search ...................................... 429/101, 120

[56] References Cited

U.S. PATENT DOCUMENTS

| | | | |
|---|---|---|---|
| 4,038,461 | 7/1977 | Warnock | 429/101 X |
| 4,107,402 | 8/1978 | Dougherty et al. | 429/120 |
| 4,324,845 | 4/1982 | Stockel | 429/101 |
| 4,546,054 | 10/1985 | Carr et al. | 429/101 |
| 4,567,119 | 1/1986 | Lim | 429/120 X |
| 4,923,769 | 5/1990 | Jones | 429/101 |
| 4,957,830 | 9/1990 | Jones | 429/101 |

OTHER PUBLICATIONS

M. Earl et al., "Design and Development of an Aerospace CPV Ni/$H_2$ Battery", 24th Intersociety Energy Conversion Engineering Conference, Washington, DC, Aug. 1989, Proc., vol. 3, pp. 1395–1400.

J. Dunlop et al., "Making Space Nickel/Hydrogen Batteries Light and Less Expensive", AIAA/DARPA Meeting on Lightweight Satellite Systems, Monterey, California, Aug. 1987, NTIS No. N88–13530.

G. Holleck, "Common Pressure Vessel Nickel–Hydrogen Battery Design", 15th Intersociety Energy Conversion Engineering Conference, Seattle, Washington, Aug. 1980, Proc., vol. 3, pp. 1908–1911.

E. Adler et al., "Design Considerations Related to Nickel Hydrogen Common Pressure Vessel Battery Modules", 21st Intersociety Energy Conversion Engineering Conference, San Diego, California, Aug. 1986, Proc., vol. 3, pp. 1554–1559.

Primary Examiner—Stephen Kalafut
Attorney, Agent, or Firm—Sughrue, Mion, Zinn, Macpeak & Seas

[57] ABSTRACT

A common pressure vessel type Ni-$H_2$ battery having a thermally conductive rack disposed within the pressure vessel and having an outer wall conforming to and in thermal contact with the inner surface of a cylindrical center wall portion of the pressure vessel and a plurality of fins dividing the rack into a plurality of compartments. A Ni-$H_2$ battery cell is disposed in each of the compartments in thermal contact with adjacent ones of the fins. A plurality of flexure springs extend between racks, providing a radial force on the racks so as to urge the outer walls of the racks into contact with respective portions of the wall of the pressure vessel. A stopper is formed internally of the pressure vessel and a wave spring is disposed between a weld ring provided at the end of the rack opposite the stopper for forcing the racks in the longitudinal direction of the pressure vessel into contact with the stopper.

17 Claims, 4 Drawing Sheets

NI-H$_2$ BATTERY HAVING IMPROVED THERMAL PROPERTIES

This is a continuation of application Ser. No. 07/501,708 filed Mar. 30, 1990, now abandoned.

BACKGROUND OF THE INVENTION

The present invention relates to a common pressure vessel type Ni-H$_2$ storage battery, such as may be used particularly in powering satellites, in which the thermal transfer properties between the individual battery cells of the cell stack and the walls of the pressure vessel of the battery are improved.

The earliest Ni-H$_2$ batteries for satellite applications employed individual pressure vessels for each cell in the battery. However, to gain improvements in specific energy and energy density and to reduce the total weight and volume of the battery, the recent trend has been to incorporate multiple cells in a stack arrangement within a single pressure vessel. This type of Ni-H$_2$ battery is termed in the art a common pressure vessel type battery. Examples of common pressure vessel type Ni-H$_2$ batteries are described in the following publications: M. Earl et al., "Design and Development of an Aerospace CPV Ni/H$_2$ Battery", 24th Intersociety Energy Conversion Engineering Conference, Washington, D.C., August 1989, *Proc.*, Vol. 3, pp. 1395–1400; J. Dunlop et al., "Making Space Nickel/Hydrogen Batteries Light and Less Expensive", AIAA/DARPA Meeting on Lightweight Satellite Systems, Monterey, Calif., August 1987, NTIS No. N88-13530; G. Holleck, "Common Pressure Vessel Nickel-Hydrogen Battery Design", 15th Intersociety Energy Conversion Engineering Conference, Seattle, Wash., August 1980, *Proc.*, Vol. 3, pp. 1908–1911; and E. Adler et al., "Design Considerations Related to Nickel Hydrogen Common Pressure Vessel Battery Modules", 21st Intersociety Energy conversion Engineering Conference, San Diego, Calif., August 1986, *Proc.*, Vol. 3, pp. 1554–1559.

In Ni-H$_2$ batteries, considerable waste heat is generated during both charge and discharge cycles. In the conventional common pressure vessel type Ni-H$_2$ battery, the individual cells were generally disposed inside of an insulating carrier. The thermal path between the heat generating portions of the cells and the wall of the pressure vessel was lengthwise through the battery cell stack components and then through the hydrogen gas of the battery to the adjacent wall of the pressure vessel. As a result, the thermal resistance between the individual cells and the pressure vessel was high, resulting in undesirably large temperature increases within the battery.

SUMMARY OF THE INVENTION

It is therefore an object of the invention to provide a common pressure vessel type Ni-H$_2$ battery in which the thermal resistance between the individual cells and the pressure vessel of the battery is greatly reduced, thereby effecting rapid heat transfer between the cells and the pressure vessel and thus allowing the specific capacity of the battery to be increased.

In accordance with the above and other objects, the invention provides a battery comprising a pressure vessel, at least one thermally conductive rack disposed within the pressure vessel and having an outer wall conforming to and in thermal contact with an inner surface of a wall of the pressure vessel and a plurality of fins dividing the rack into a plurality of compartments, and a plurality of battery cells, one or more of the battery cells being disposed in each of the compartments in thermal contact with adjacent ones of the fins. A first spring, which may be a plurality of flexure springs extending between ones of the racks, provides a radial force on the racks forcing the outer walls of the racks into contact with respective portions of the wall of the pressure vessel. A stopper may be formed inside of the pressure vessel and a second spring, which may be a wave spring, is provided for forcing the racks into contact with the stopper with the stopper in the longitudinal direction of the pressure vessel.

BRIEF DESCRIPTION OF THE DRAWINGS

FIG. 6 is a cross-sectional view taken along a line VI—VI in FIG. 1 illustrating the mode of interconnection between the cells of the battery.

DESCRIPTION OF THE PREFERRED EMBODIMENTS

Preferred embodiments of the invention will now be described with reference to the attached drawings.

Figure 1:
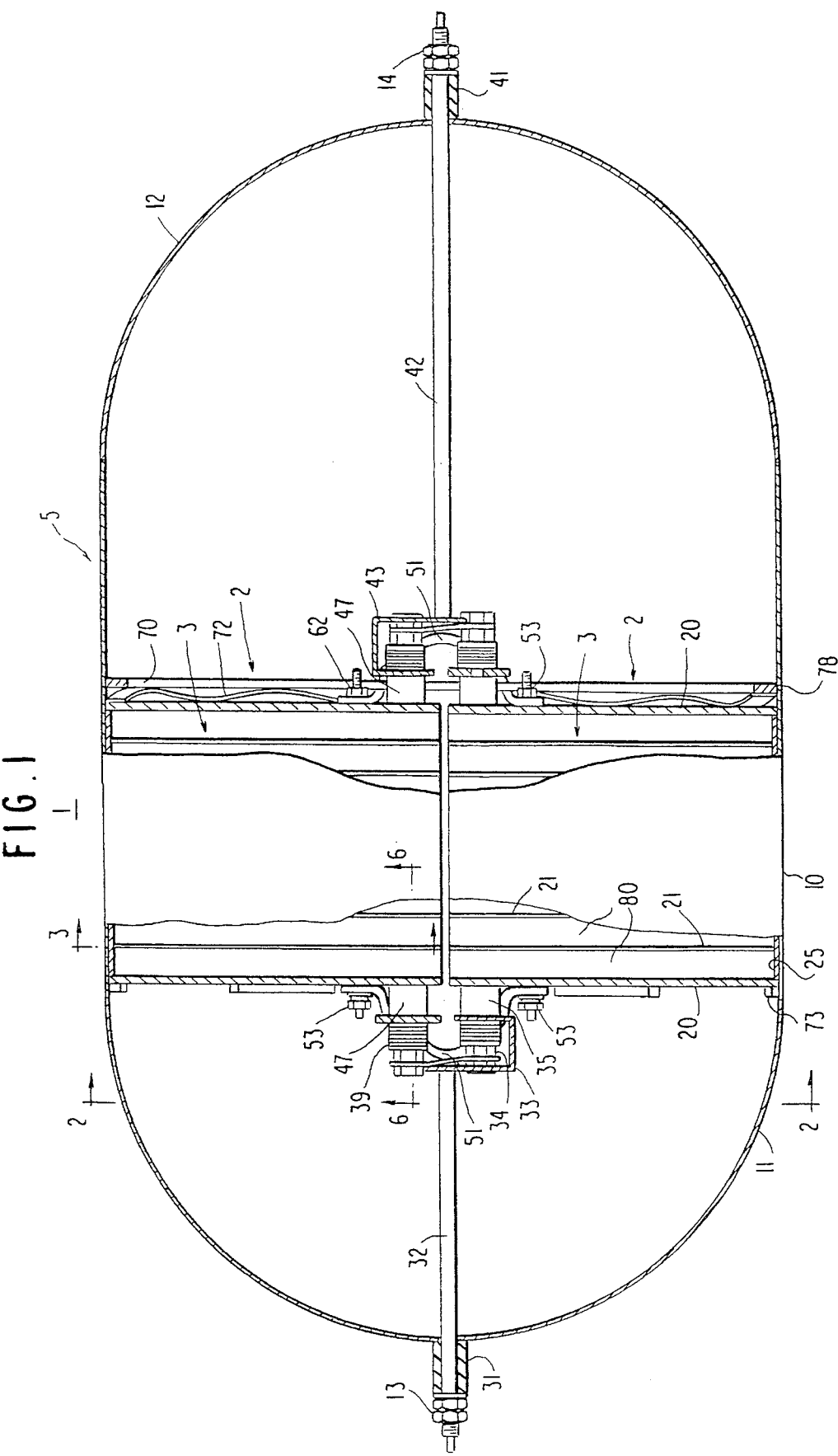
FIG. 1 is partially cut-away cross-section view of a common pressure vessel type Ni-H$_2$ battery constructed in accordance with a preferred embodiment of the present invention.

Referring first to FIG. 1, a pressure vessel 5 of a preferred embodiment of an Ni-H$_2$ battery 1 of the invention is composed of a central cylindrical portion 10 capped at respective ends by semi-spherical end portions 11 and 12. Two identical cell stacks 2 are mounted adjacent one another within the pressure vessel 5.

Each of the cell stacks 2 includes a cell rack 3 which has a generally semi-cylindrical outer configuration and is divided into a plurality of compartments, in each of which is received one or more battery cells 80. Each of the cell stacks 2 has an outer wall 25 having the shape of a cylinder sliced lengthwise along a plane slightly offset from the longitudinal axis of the cylinder so that a small gap is provided between the two cell stacks 2. The outer wall 25 conforms to and is in contact throughout its surface with the inner surface of the adjacent wall of the cylindrical portion 10 of the pressure vessel 5. The two ends of the outer wall 25 are closed by generally semi-circular end plates 20. The interior of the rack is divided by walls or fins 21 into the cell-receiving compartments in which are disposed the individual battery cells 80.

Figure 3:
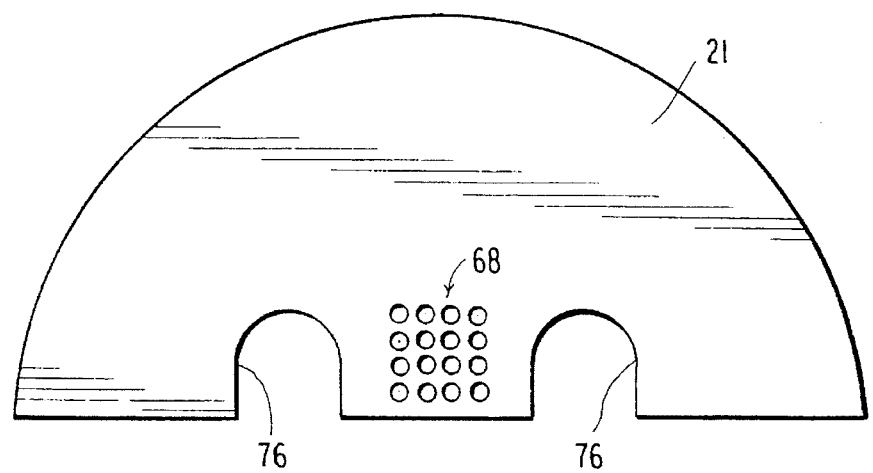
FIG. 3 is a view taken along a line III—III in FIG. 1 showing the configuration of an interior wall of a cell rack of the battery.

As shown best in FIGS. 3 and 6, each fin 21 has a pair of cut-outs 76 through which pass cell electrode interconnecting rods 36 and 46, as will be explained in more detail below. Also, a grid of holes 68 is formed in each end fin to permit the circulation of hydrogen gas to the end battery cells 80. All components of the racks 3 are formed of a metal such as aluminum or another material having a good thermal conductivity.

Figure 5:
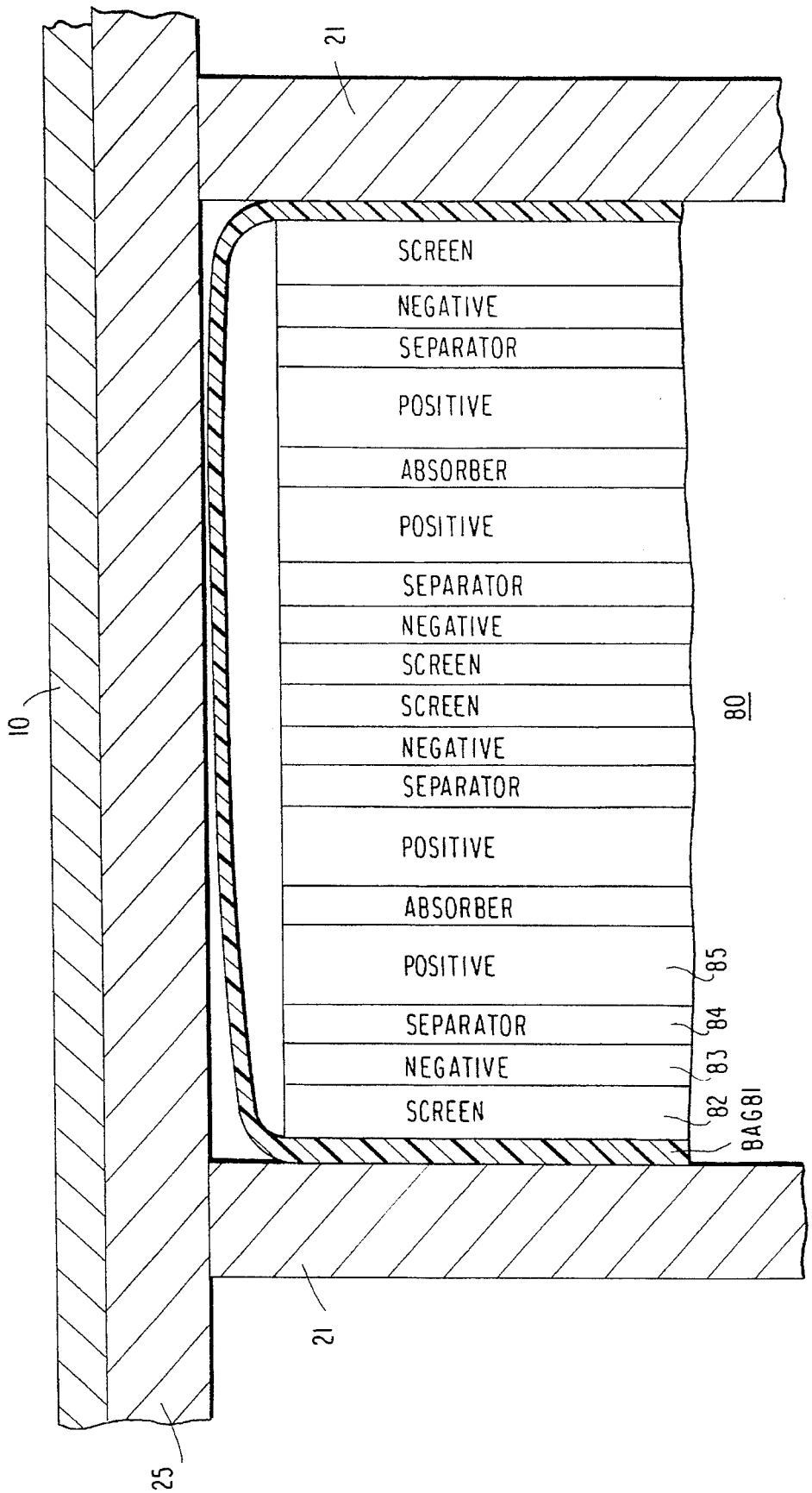
FIG. 5 is an enlarged cross-sectional view showing the relationship between the vessel wall, cell rack and individual cells of the battery of FIG. 1.

With reference to FIG. 5, each battery cell 80 contains a repeating pattern of a gas diffusion screen 82, negative electrode 83, separator 84, and positive electrode 85. The arrangement of and selection of the materials for these components is conventional and well within the skill of those familiar with this art. Each cell 80 is encased in a plastic bag 81 which electrically insulates the above-mentioned components from the fins 21. The outer sides of the bag 81, however, are in intimate thermal contact with the fins 21 on both sides of the cell so as to provide good thermal conduction between the cell 80, over its entire surface, and the fins 21.

As shown best in FIG. 6, each cell 80 has positive electrode terminals 86 and negative electrode terminals 87 to which are respectively connected the positive and negative electrodes 85 and 83 of the cell 80. Insulated interconnecting rods 36 and 46 pass through center holes in the terminals 86 and 87, respectively. Contact with the fins 21 is avoided by the provision of the cut-outs 76.

Figure 2:
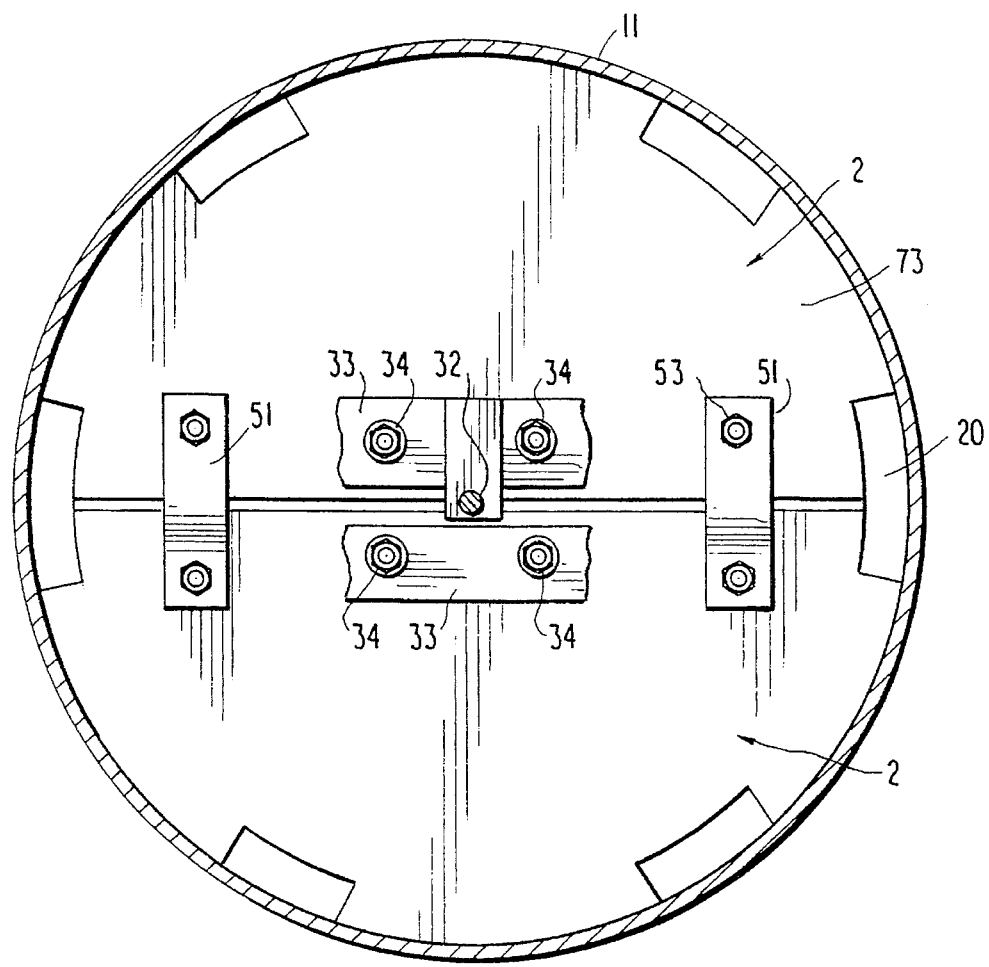
FIG. 2 is a cross-sectional end view of the battery of FIG. 1 taken along a line II—II in FIG. 1.

Referring to FIGS. 1, 2 and 6, the ends of the rods 36 and 46 pass through respective cut-outs formed in the end walls 20, terminal link spacers 35 and 47, and washer stacks 39, and are fixed in place by nuts 34. The terminal link spacers on the rods 36 and 46 from one end of one cell stack 2 are interconnected through a bus member 33 to a terminal rod 32, and thence through an insulating sleeve 31 fixed to the end member 11 of the pressure vessel 5 to a positive output terminal 13. Similarly, the terminal link spacers on the rods 36 and 46 from the other cell stack 2 are interconnected through a bus member 43 to a terminal rod 42, and thence through an insulating sleeve 41 fixed to the end member 12 of the pressure vessel 5 to a negative output terminal 14.

Figure 4:
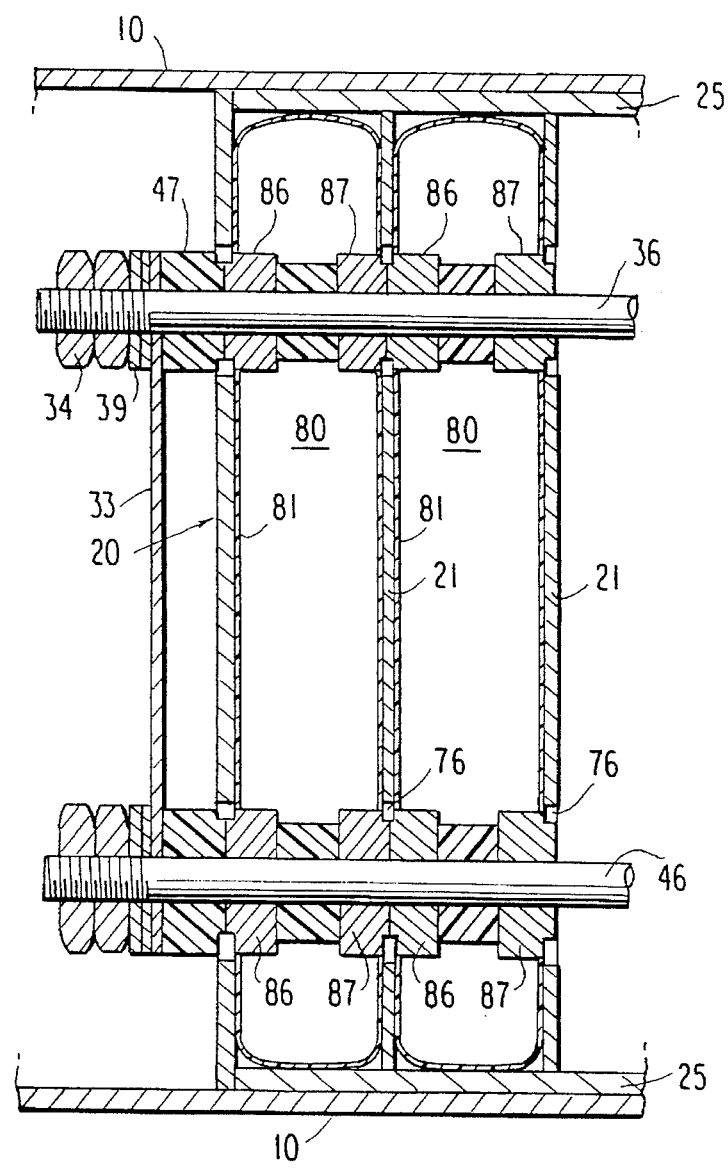
FIG. 4 is an enlarged cross-sectional view showing the details of the joining of a weld ring shown in FIG. 1 to the walls of the pressure vessel.

An segmented stopper 73 is fixed to the inner surface of the cylindrical portion 10 of the pressure vessel 5 and the junction with the end portion 11. Alternately, an annular stopper or another weld ring can be used in place of the segmented stopper 73. Rim portions of the end walls 20 of the racks 3 abut against the stopper 73. As shown in the enlarged view of FIG. 4, an annular shaped weld ring 70 is fixed between the cylindrical portion 10 and the end portion 12 of the pressure vessel 5 by welding 78. A wave spring 72, fitted between the weld ring 70 and the opposite end of the racks 3, provides preloading on the racks 3 in the axial direction thereof. Further, flexure springs 51, attached by bolts 53 and 62, are coupled between the end walls 20 of the two racks 3 at both ends thereof. The flexure springs 51 provide a radial preloading force on the racks 3 which urges their outer walls 25 into contact with the inner surface of the wall of the cylindrical portion 10 of the pressure vessel 5. Due to these two preloading forces, the structural response to vibration of the assembly is eliminated and the thermal resistance between the racks and the pressure vessel 5 minimized.

With the above-discussed battery structure, heat generated within each battery cell 80 is rapidly transferred through the fins 21 to the outer wall 25 of the racks 3, and thence, due to the tight contact between the wall 25 and the cylindrical portion 10, to the pressure vessel 5. As a result, the thermal conductivity between the battery cells 80 and the pressure vessel 5 is greatly improved compared with a conventional common pressure vessel type Ni-H$_2$ battery.

Although preferred embodiments of the invention have been described, it is believed that numerous modifications and alterations thereto would be apparent to one of ordinary skill in the art without departing from the spirit and scope of the invention. For example, although the above preferred embodiment of the invention has been described with reference to a pressure vessel which is circular in cross section, the invention can equally be applied to batteries having a pressure vessel with a rectangular or other desired cross section. Also, different types of springs than those described above can be used so long as they provide the requisite preloading forces. Moreover, although it is preferred to practice the invention with a common pressure vessel type battery, the invention can be applied to batteries having individual pressure vessels. Yet further, the invention can be applied to batteries other than those of the Ni-H$_2$ type.

What is claimed is:

1. A battery comprising:

a pressure vessel;

at least one thermally conductive rack disposed within said pressure vessel, said rack comprising an outer wall closely adjacent and conforming to an inner surface of a wall of said pressure vessel so as to be in close thermal contact with said inner surface of said wall of said pressure vessel whereby heat from said rack is transferred to said wall of said pressure vessel, and a plurality of fins dividing said rack into a plurality of compartments; and a plurality of battery cells, at least one of said battery cells being disposed in each of said compartments in thermal contact with adjacent ones of said fins.

2. The battery of claim 1, further comprising spring means for forcing said rack into contact with said wall of said pressure vessel.

3. The battery of claim 1, wherein there are provided a plurality of said racks.

4. The battery of claim 3, wherein said plurality of said racks are disposed adjacent one another around a lengthwise axis of said pressure vessel.

5. The battery of claim 4, further comprising first spring means for providing a radial force on said racks for forcing said racks into contact with respective portions of said wall of said pressure vessel.

6. The battery of claim 5, wherein said pressure vessel has a stopper formed internally thereof, and further comprising second spring means for forcing said racks in a longitudinal direction of said pressure vessel into contact with said stopper.

7. The battery of claim 6, wherein said pressure vessel is circular in cross section, and said racks are two in number and are generally semi-circular in cross section.

8. The battery of claim 1, wherein said cells are Ni-H$_2$ battery cells.

9. A battery comprising:

a pressure vessel;

a plurality of thermally conductive racks disposed within said pressure vessel, each of said racks comprising an outer wall conforming to and in thermal contact with a respective portion of an inner surface of a wall of said pressure vessel and a plurality of fins dividing said rack into a plurality of compartments;

at least one battery cell disposed in each of said racks in thermal contact with said rack; and spring means for forcing said racks into contact with said wall of said pressure vessel.

10. The battery of claim 9, wherein said pressure vessel has a stopper formed internally thereof, and wherein said spring means comprises first spring means for providing a radial force on said racks for forcing said racks into contact with respective portions of said wall of said pressure vessel, and second spring means for forcing said racks in a longitudinal direction of said pressure vessel into contact with said stopper.

11. The battery of claim 10, wherein said first spring means comprises a plurality of flexure springs each having one end coupled to one of said racks and another end coupled to another of said racks.

12. The battery of claim 11, further comprising a weld ring in said pressure vessel has a weld ring at an end thereof opposite said stopper, and wherein said second spring means comprises a wave spring disposed between said weld ring and said racks.

13. The battery of claim 11, wherein said pressure vessel is circular in cross section, and said racks are two in number and are generally semi-circular in cross section.

14. The battery of claim 9, wherein said cells are Ni-$H_2$ battery cells.

15. A common pressure vessel type Ni-$H_2$ battery comprising:

a pressure vessel having a cylindrical center portion and dome-shaped end portions;

first and second battery cell racks disposed within said pressure vessel and arranged adjacent each other, each of said racks comprising a semi-cylindrical outer wall conforming to and contacting an adjacent portion of an inner surface of said cylindrical center portion of said pressure vessel, a pair of semi-circular end walls, and a plurality of semi-circular fins dividing said rack into a plurality of battery cell receiving compartments;

a plurality of Ni-$H_2$ battery cells, at least one of said battery cells being disposed in each of said compartments in thermal contact with adjacent ones of said fins;

a pair of interconnecting rods for each of said racks, each of said racks interconnecting like-polarity electrode terminals of said battery cells within a respective one of said racks;

a pair of positive and negative output terminals protruding from said pressure vessel;

means for connecting each of said rods to a one of said output terminals;

a stopper fixed to said pressure vessel at one end of said cylindrical portion;

a weld ring fixed to said pressure vessel at the other end of said cylindrical portion;

a wave spring disposed between said weld ring and one of said end walls of said racks for forcing said racks in a direction of said stopper; and a plurality of flexure springs extending between said racks for forcing said racks radially outward to press said outer walls of said rack against said inner surface of said cylindrical portion.

16. The battery of claim 15, wherein said fins have cutouts formed therein through which pass said rods.

17. The battery of claim 16, wherein outer ones of said outer fins each have a grid of holes formed therein to permit circulation of hydrogen gas to said cells.

* * * * *